United States Patent [19]

Bright et al.

[11] Patent Number: 5,403,416
[45] Date of Patent: Apr. 4, 1995

[54] METHOD OF LABELING CONTAINERS WITH CONVEX SURFACES

[75] Inventors: Lyn E. Bright, Ceres; Hugh E. Cummins, Turlock, both of Calif.

[73] Assignee: B & H Manufacturing Co., Inc., Ceres, Calif.

[21] Appl. No.: 992,627

[22] Filed: Dec. 18, 1992

[51] Int. Cl.⁶ .............................................. B32B 31/26
[52] U.S. Cl. ..................................... 156/86; 156/446; 156/449; 215/1 C; 215/12.2
[58] Field of Search ..................... 156/85, 86, DIG. 9, 156/DIG. 10, DIG. 11, DIG. 12, DIG. 13, DIG. 18, DIG. 25, DIG. 26, DIG. 36, DIG. 37, 446, 449; 215/1 C, 12.2

[56] References Cited

U.S. PATENT DOCUMENTS

| | | | |
|---|---|---|---|
| 3,829,348 | 8/1974 | Spiegel et al. | 156/86 |
| 4,108,709 | 8/1978 | Hoffmann | 156/446 |
| 4,225,049 | 9/1980 | Inoue | 215/12.2 |
| 4,406,721 | 9/1983 | Hoffmann | 156/86 |
| 4,416,714 | 11/1983 | Hoffmann | 156/86 |
| 4,500,386 | 2/1985 | Hoffmann | 156/449 |
| 4,704,173 | 11/1987 | Hoffmann | 156/86 |
| 4,872,931 | 10/1989 | Mitchell | 156/86 |
| 4,976,798 | 12/1990 | Hoffman | 156/86 |

*Primary Examiner*—Caleb Weston
*Attorney, Agent, or Firm*—Flehr, Hohbach, Test, Albritton & Herbert

[57] ABSTRACT

Method and apparatus for applying heat shrinkable segments of sheet material to articles having a convex sector, e.g., for applying labels to containers. Each segment is attached at its leading end to the area of maximum diameter of the convex sector, preferably flattening such area and adhesively attaching the leading end of the segment to the flattened area, then spinning the article and wrapping the segment about it and attaching the trailing end to the container or to the leading end, then causing the so wrapped article to pass through a heating and shrinking station, spinning it while so doing and applying jets of hot air to the segment above and below the area of maximum diameter to shrink the segment onto the convex sector. Apparatus suitable for carrying out this procedure is also described.

16 Claims, 6 Drawing Sheets

METHOD OF LABELING CONTAINERS WITH CONVEX SURFACES

This invention relates to labeling articles, more particularly containers such as bottles and cans intended for beverages such as soft drinks.

BACKGROUND OF THE INVENTION

The term "label" is used herein for convenience but it is to be understood that sheet or film material other than labels may be used, e.g., for decorative purposes, for reinforcement of containers, etc.

Also the term "container" is used herein for convenience but it will be understood that other articles having the same geometric configuration may be employed.

It is known to apply labels to containers by the following procedure: A continuous strip of label material is supplied continuously to a rotating vacuum drum; individual labels are severed from the strip before they are deposited on the vacuum drum or preferably just after the leading end of a label is deposited on the surface of the drum; the vacuum drum rotates each label in turn past a glue applicator, or past a solvent applicator, which applies glue to one or both ends of the label or applies a solvent which is absorbed by the label material and forms an adhesive material in situ; and each label, in turn, is transported to a label applying station where it is released. Meanwhile containers or other articles to which the labels are to be applied are conveyed continuously to the label applying station; the leading end of each label is adhered to a container by glue or other adhesive; the container is caused to spin about its longitudinal axis whereby the label is wrapped around it and the trailing end of the label is adhered directly to the container or to the overlapped portion of the leading end of the label and is adhesively secured thereto. During this label application the container is confined and is spun between solid surfaces, one or both of which may be resilient. The labeled container may be caused to continue spinning after label application, for example, between a pad and a moving belt to smooth the label and attach it more securely to the container.

Such a method is described in U.S. Pat. No. 4,500,386 together with suitable apparatus for carrying out the method.

Other methods and apparatus may be used. For example, precut labels may be supplied from a stack of the same; a turret type of machine such as described in U.S. Pat. No. 4,108,709 may be used, etc.

It is common to use labels of heat shrinkable material, to apply the labels to containers as described above and to apply heat to the label on the container to shrink the projecting edges of the label onto sloping or contoured portions of the container as described in U.S. Pat. No. 4,704,173 and to produce an article such as described in U.S. Pat. No. 4,844,957. Such heat shrinkable labels may be made of polystyrene, polypropylene, polyvinyl chloride, polyethylene and blends of such materials. Also the labels may be laminated. Such label materials are well known in the art.

Difficulties are, however, encountered in this procedure where the surface to be labeled with a heat shrinkable label is convex in shape. For example, the classic Coca-Cola bottle has a shape as follows: The lower part is fluted, the upper part (below the neck) is also fluted and between the two fluted areas is a convex portion or sector which it is desired to label. If a non-heat shrinkable label is applied to this surface, difficulties are encountered in conforming the label to the convex surface. This difficulty can be alleviated by applying a heat shrinkable label to the convex surface at its greatest diameter (i.e., furthest from the vertical axis of the bottle), then shrinking it onto the convex surface. However it is difficult to apply the label initially to the convex sector and it is also difficult to shrink the label, after it has been initially applied, onto the convex sector in a proper manner so as to present a neat, pleasing appearance.

SUMMARY OF THE INVENTION

In accordance with the present invention labels are applied to containers as described above and as described in U.S. Pat. No. 4,500,386 although other methods may be employed. When the container is flexible, e.g., made of plastic such as polyethylene terephthalate (PET), polypropylene, etc., pressure is applied to the convex sector of the container to create a temporary flat area to which the label may be attached by adhesive. The labeled container may be rotated between two solid surfaces, e.g., a fixed pad and a moving belt, to smooth and more securely attach the label to the convex sector. Then the labeled containers are moved through a heating station equipped with a series of fan-shaped heater nozzles provided with the necessary heaters and blowers and the containers are caused to spin as they move through the heating station. The nozzles apply to the unattached portions of the label projecting from the area of maximum diameter jets of hot air to shrink the loose parts of the label onto the convex sector. The result is a container with a heat shrunk label applied smoothly to the convex sector.

OBJECTS OF THE INVENTION

It is an object of the present invention to provide improvements upon such heat shrink labeling.

It is a particular object of the invention to provide an apparatus, a system and a method whereby heat shrinkable material may be applied rapidly and attached sufficiently for the purpose to a convex sector on a container, or other article and then heated to shrink the label properly onto the convex portion.

Yet another object is to provide containers so labeled.

The above and other objects of the invention will be apparent from the ensuing description in the appended claims.

DETAILED DESCRIPTION OF THE PREFERRED EMBODIMENTS

Figure 1:
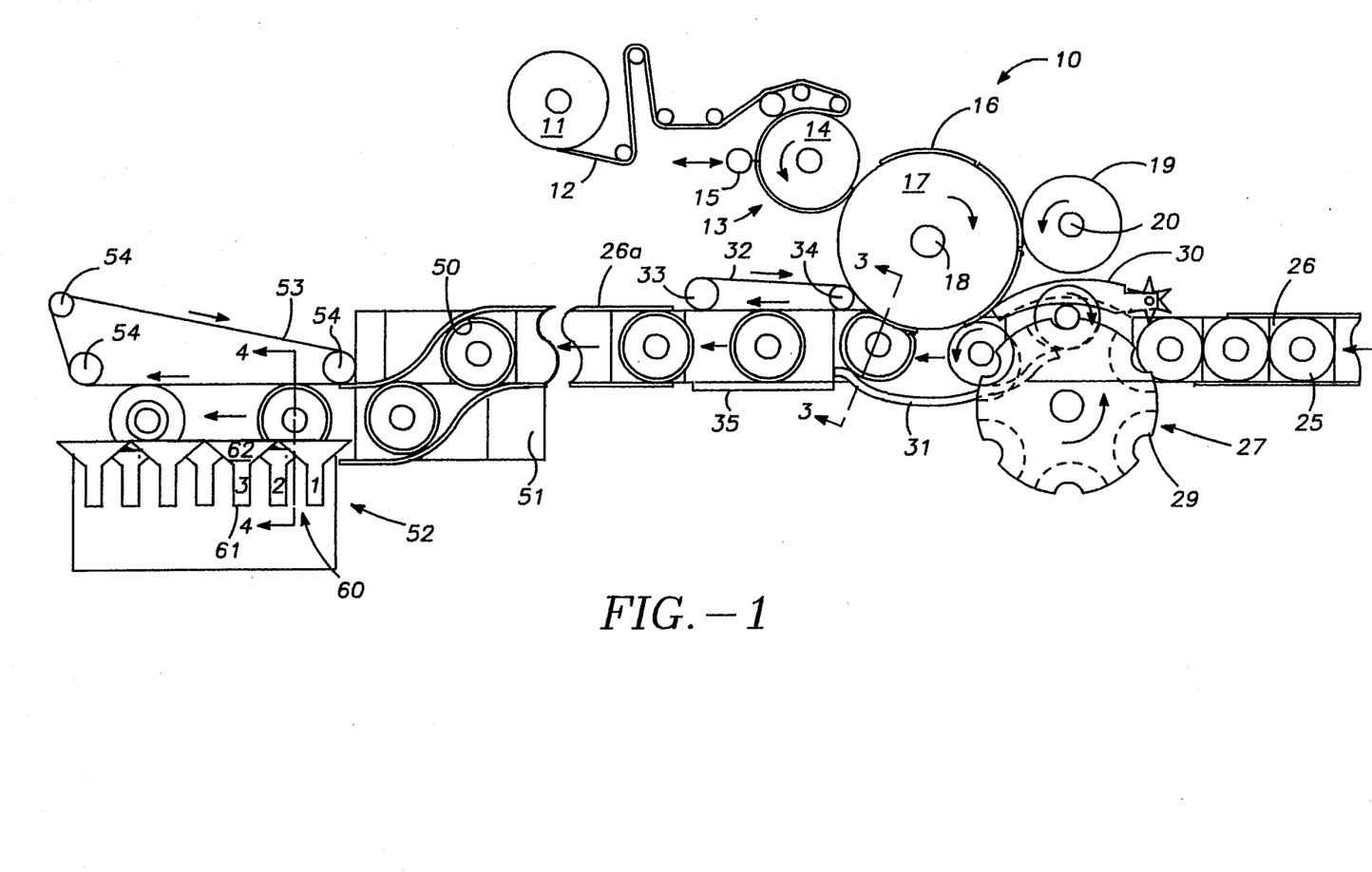
FIG. 1 is a top plan view of a system for applying heat shrinkable labels to articles such as containers having a convex sector to which it is desired to apply the labels.

Referring now to the drawings, and first to FIG. 1, a system designated by the reference numeral 10 is provided, including a roll 11 of heat shrinkable label material 12 which is fed continuously by way of a series of guide, tensioning and drive rollers (unnumbered) to a cutter 13 comprising a back-up roller 14 and a rotating or oscillating cutter roller or knife 15 which severs individual labels 16 from the continuous label stock and deposits each label on a vacuum drum 17 rotating with a shaft 18. Preferably each label is cut after its leading end is deposited on the vacuum drum and the vacuum drum 17 is rotated at a surface speed slightly exceeding the speed of the label material 12 to apply a small tension to the label material. Each label, in turn, is rotated past a glue applicator 19 rotating on a shaft 20 which applies hot melt glue and/or solvent to the leading end of the label and to the trailing end of the label.

The equipment thus far described may be of well known construction such as that described in U.S. Pat. No. 4,108,110.

Containers 25, described in detail below with reference to FIG. 2, enter the system at the right as viewed in FIG. 1 on a conveyor 26. Each container, in turn, is delivered to a star wheel 27 rotating with a shaft 28 and is deposited in a pocket 29 and is then trapped between a curved guide or roll-on pad 30 and the star wheel. Each container in turn is released by the star wheel as the star wheel continues rotation and enters the space between a curved roll-on pad 31 and the vacuum drum 17, such pad being concentric to the vacuum drum. Vacuum is released for each label as it reaches the point of contact with a container, so that it can be wound around the container as the container spins, the adhesive at the leading and trailing ends of the label serving to adhere the container, either in a full wrap fashion wherein the trailing end is lapped over and adhered to the leading end, or what is termed a "spot label" where the trailing end does not extend to the leading end of the label. The labeled container is then released to the conveyor 26a, being spun and compressed by a belt 32 on rollers 33 and 34 and a plate or pad 35 to more securely attach the label to the container.

The star wheel-roll on pad-container feed and spinning means may be, e.g., that shown in U.S. Pat. No. 4,500,386.

Figure 2:
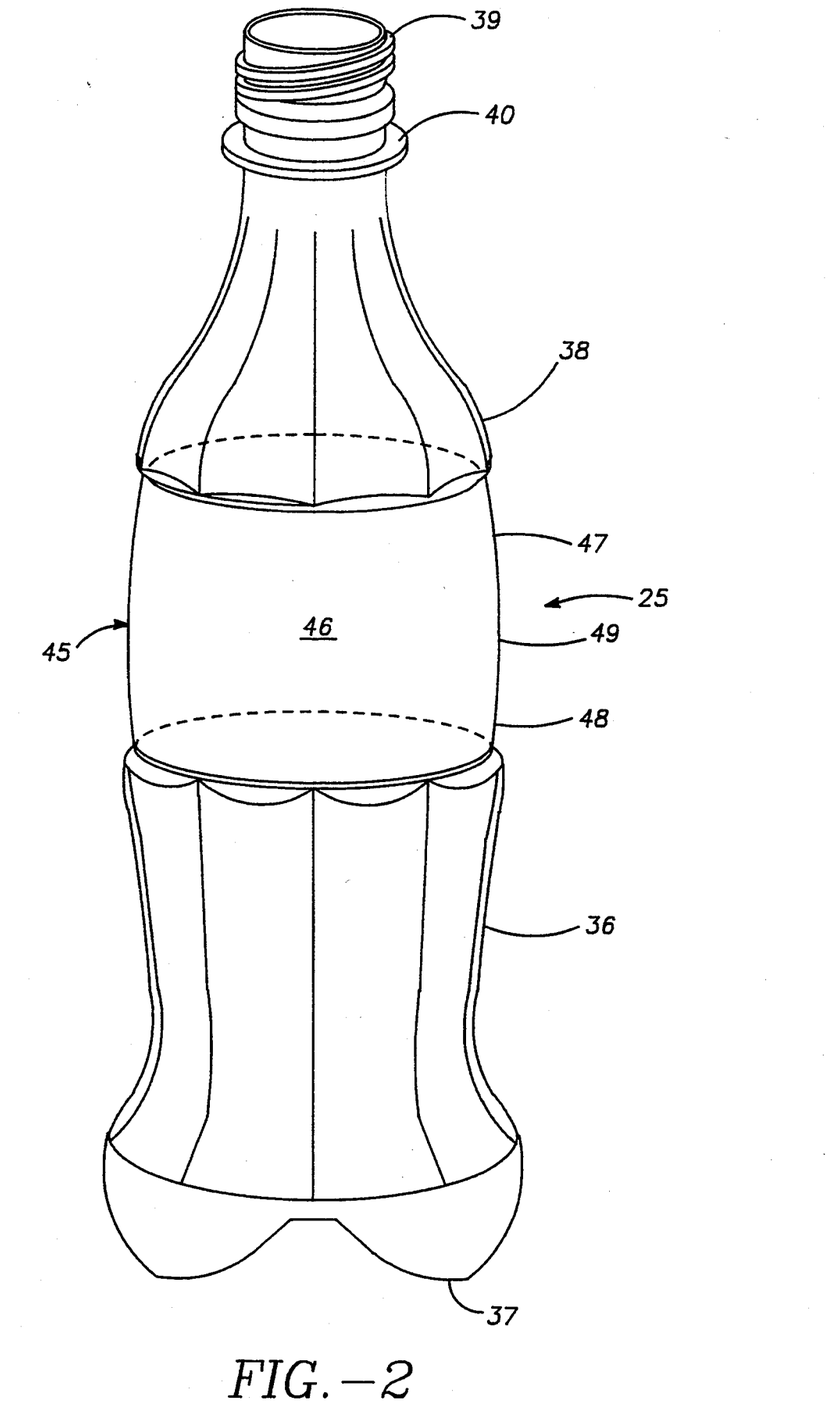
FIG. 2 is a view in elevation of a container of the type described above.

Referring now to FIG. 2, a container 25 such as that described above is shown in elevation, such being of plastic construction, e.g., PET, polyethylene, polyvinyl chloride or polypropylene of a grade and thickness suitable for construction of container. The container may be made of glass, metal or other material but usually it is made of plastic. This container is shaped as follows: There is a lower portion 36 which is fluted as shown for purposes of decoration and/or reinforcement; there is a bottom portion including projections 37 which provide the bottom of the bottle; there is an upper inwardly sloping neck or shoulder portion 38 which is also fluted and there is a threaded top 39 to receive a screw cap and a projecting ring 40 which is useful in transporting the container, empty or filled, from place to place as needed.

The manufacture of such containers is well known. The threaded top is commonly made by injection molding and is attached to a tube of thinner material which is blown in a mold into the shape which is shown.

Between the lower portion 36 and the upper portion 38 is a contoured mid-portion or sector 45 presenting a convex surface 46 including an upper portion 47, a lower portion 48 and a mid-portion or area of maximum diameter 49. The sector 46, or label panel as it is known, is thinner than the upper and lower portions 37 and 38. Typically such container is of twenty ounce size, but the present invention is applicable to larger and smaller containers and to containers of other shapes which have in common a sector which is convex. Such convex sector may constitute larger or smaller portion of the overall surface of the container.

The usual purpose of the contoured sector 45, besides being an integral part of the structure, is to receive a label. It is, of course, desirable that the label be applied smoothly, evenly, attractively and securely. This presents a problem in that a non-shrinkable label, if applied properly, requires pressure from some kind of pressure member to conform it to the convex surface 46. This is difficult to achieve. A heat shrinkable label can be applied to the portion 49 of maximum diameter but this also presents a problem in that initial application to the portion 49 of maximum diameter is difficult unless a pressure member or a matching concave shape is employed.

Figure 3:
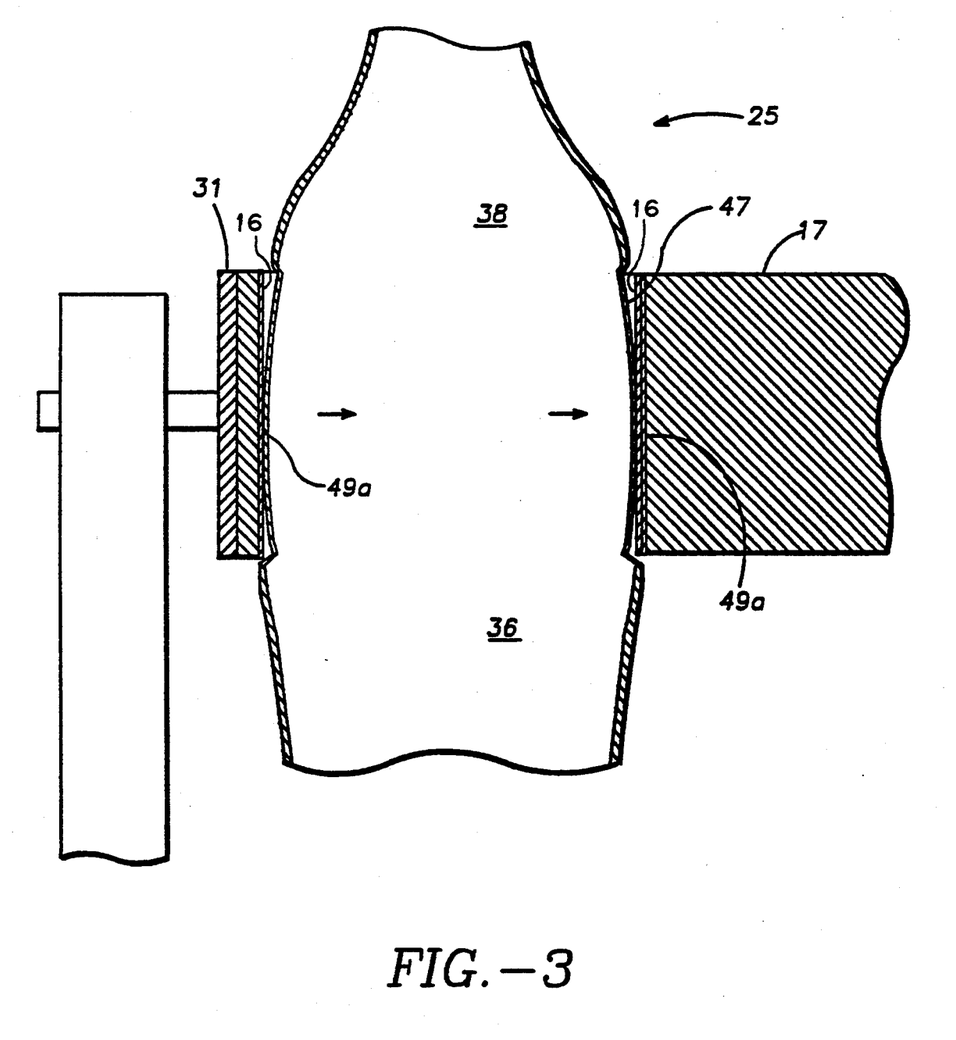
FIG. 3 is a section taken along the line 3—3 of FIG. 1 showing how a label is initially applied to a container.

Referring now to FIG. 3, a container 25 of the type shown in FIG. 2 is shown squeezed between the vacuum drum 17 and the roll-on pad 31. The container is shown in elevation and the vacuum drum and roll-on pad are shown in section. A label 16 is shown trapped between the container 25 and vacuum drum 17 and between the container 25 and the roll-on pad 31 at the mid-section 49 of maximum diameter. The spacing of the drum 17 and the roll-on pad 31 are such as to squeeze the mid-section 45 inwardly, creating a small flat area shown at 49a to which the label adheres sufficiently for purposes of the invention.

The container 25, being plastic, is flexible and is amenable to such a flattening operation. If a glass container or a container of thick plastic or other material which is not flexible is used, such may not be possible. However, by using a good quality of adhesive and/or applying an adequate pressure the label may be secured sufficiently for subsequent operations as hereinafter described.

Figure 4:
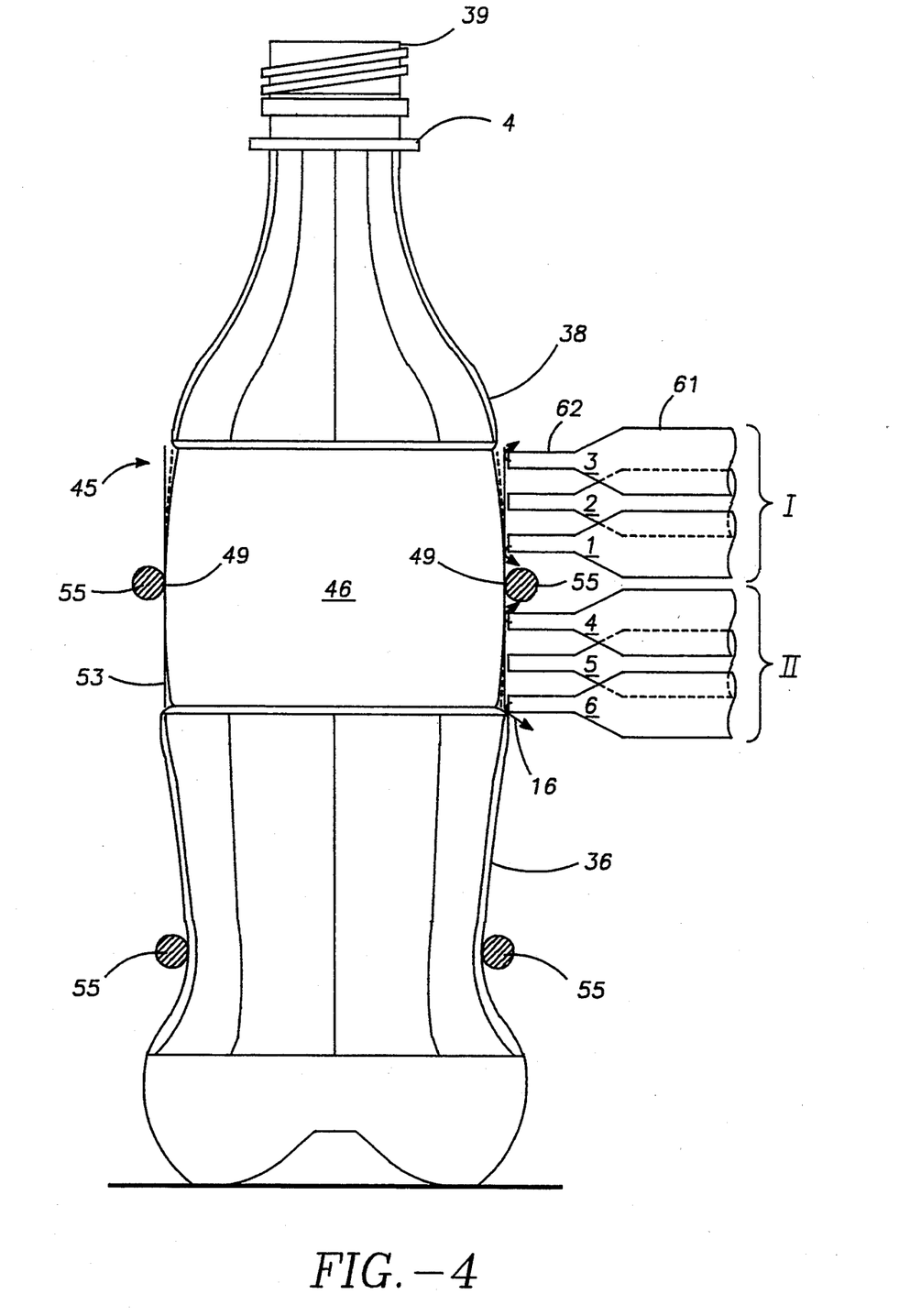
FIG. 4 is a section taken along the line 4—4 of FIG. 1 showing how hot air is applied to complete the label application.

Referring again to FIG. 1, containers 25 to which labels are thus initially applied pass from conveyor 26a through a connecting conveyor 50 onto a conveyor 51 which moves the initially labeled containers through a heat shrink station 52, the containers being spun by a belt 53 trained around rollers 54 of which one is driven, the containers being restrained against lateral movement by rods 55, see FIG. 4. One of the rods 55 is located to contact the label 16 and the container 25 at the area 49 of greatest diameter.

Figure 5:
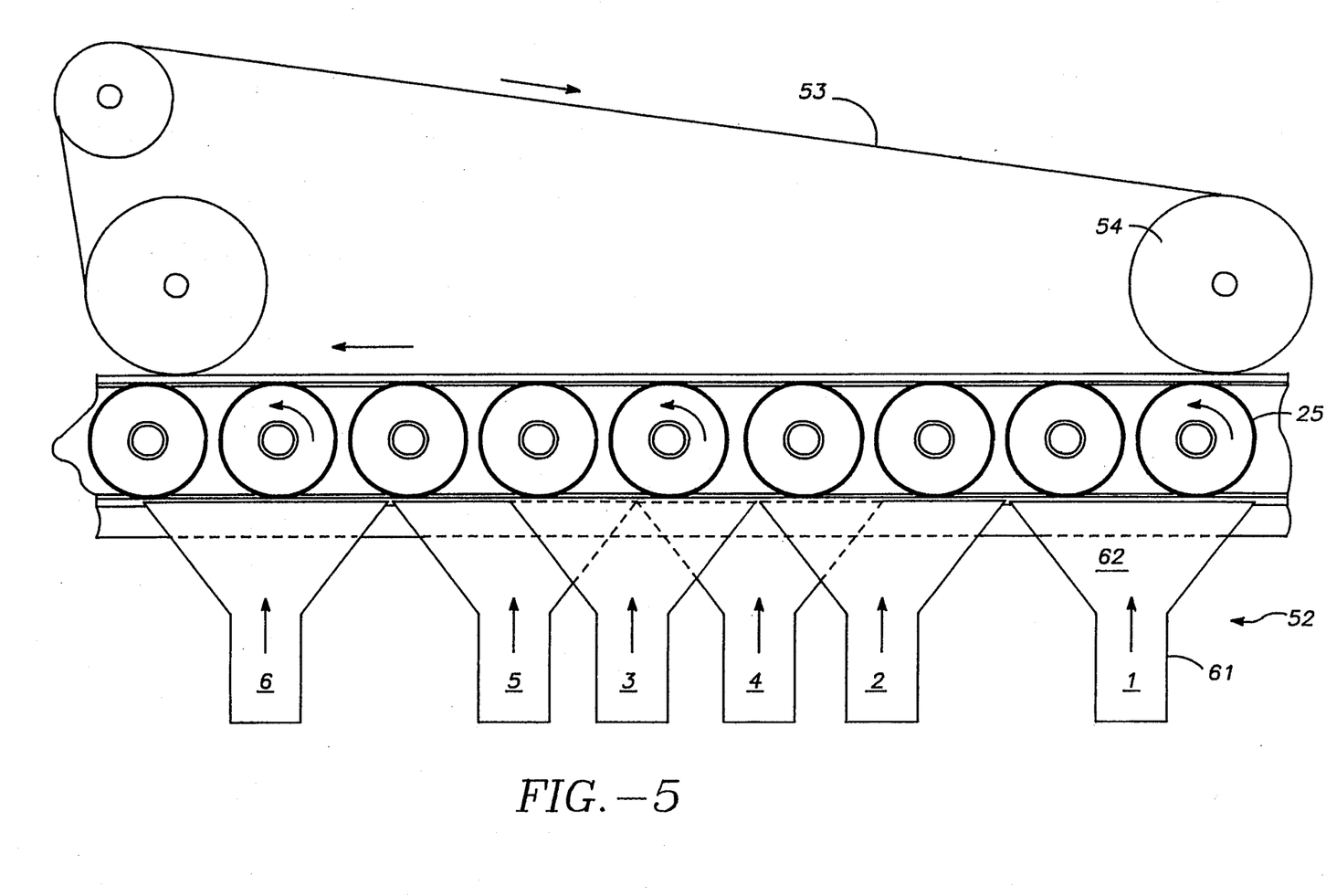
FIG. 5 is a view looking down on the heating station.

Referring now to FIGS. 4 and 5, a series of nozzles 60 are provided each having an inlet tube 61 and a fan shaped mouth 62, each tube being connected to an electric heater and an air blower (not shown) which can be adjusted as to temperature, volume and velocity of the air. There is an upper set of nozzles indicated as I and a lower set of nozzles indicated as II. The upper set I is aligned with the portion of the label 16 which is above the mid-portion 49 of maximum diameter and the lower set II is aligned with the label below such mid-portion. The mouth 62 delivers a wide but thin current of hot air which may be described as knife-like.

Referring more particularly to FIG. 4, the nozzles in the upper set I are numbered 1, 2 and 3; the lowest of these nozzles, numbered 1, is juxtaposed to the label 16 just above the mid-portion 49 of the sector 45; No. 2 is located just above No. 1; and No. 3 is located near the top of label 16.

The lower set II are numbered 4, 5 and 6; No. 4 is located just below the mid-portion 49; No. 5 is located lower; and No. 6 is located near the bottom edge of the label 16.

Referring now to FIG. 5, the nozzles of set I are arranged as shown; i.e., with nozzle 1 being located at the starting point of the heating station 52; nozzle 2 being downstream and nozzle 3 being still further downstream at about mid-point of the heating station 52.

The lower set II of nozzles 4, 5 and 6 are similarly arranged with No. 4 being upstream relative to No. 5 and No. 5 being upstream relative to No. 6.

As a container 25 travels through the heating assembly 52 with a label attached at the mid-portion 49 of the container and spins as it travels, the label is first heated by nozzle 1, which causes it to shrink onto the container near the mid-portion 49; then it is heated by nozzle 2 and is caused to shrink farther up; and then it is heated by nozzle 3 and is caused to shrink so that the entire upper part of the label is shrunken onto the sector 47 of the container.

The same procedure is carried out by nozzles 4, 5 and 6 causing first that portion of the label close to the mid-portion 49 to shrink onto the container, then a portion farther down and finally the lower most portion is shrunk onto the container.

Variants of this progressive heat shrinking procedure may be employed. For example, the lower set of nozzles 4, 5 and 6 may be located directly below the upper set of nozzles; or the two sets may be overlapping in relation to their distribution along the path of travel; or the lower set II may precede the upper set I. Also, the number of nozzles in each set may vary. For example, either set may consist of two or even one nozzle where the region 47 and/or the region 48 is short. Where one of the portions 47, 48 is longer than the other it may be provided with more nozzles than the other portion.

Another consideration is as follows: It is desirable to limit the shrinkage as much as possible to shrinkage along the length of the label, i.e., in the direction of the leading and trailing ends of the label and to minimize shrinkage across the label, i.e., in the direction of the upper and lower edges of the label. Accordingly, heat shrinkable labeling material having such a property is preferred, such being well known in the art.

Also the air speed and temperatures should be such as to cause the desired shrinkage but not to distort the film or the container.

Figure 6:
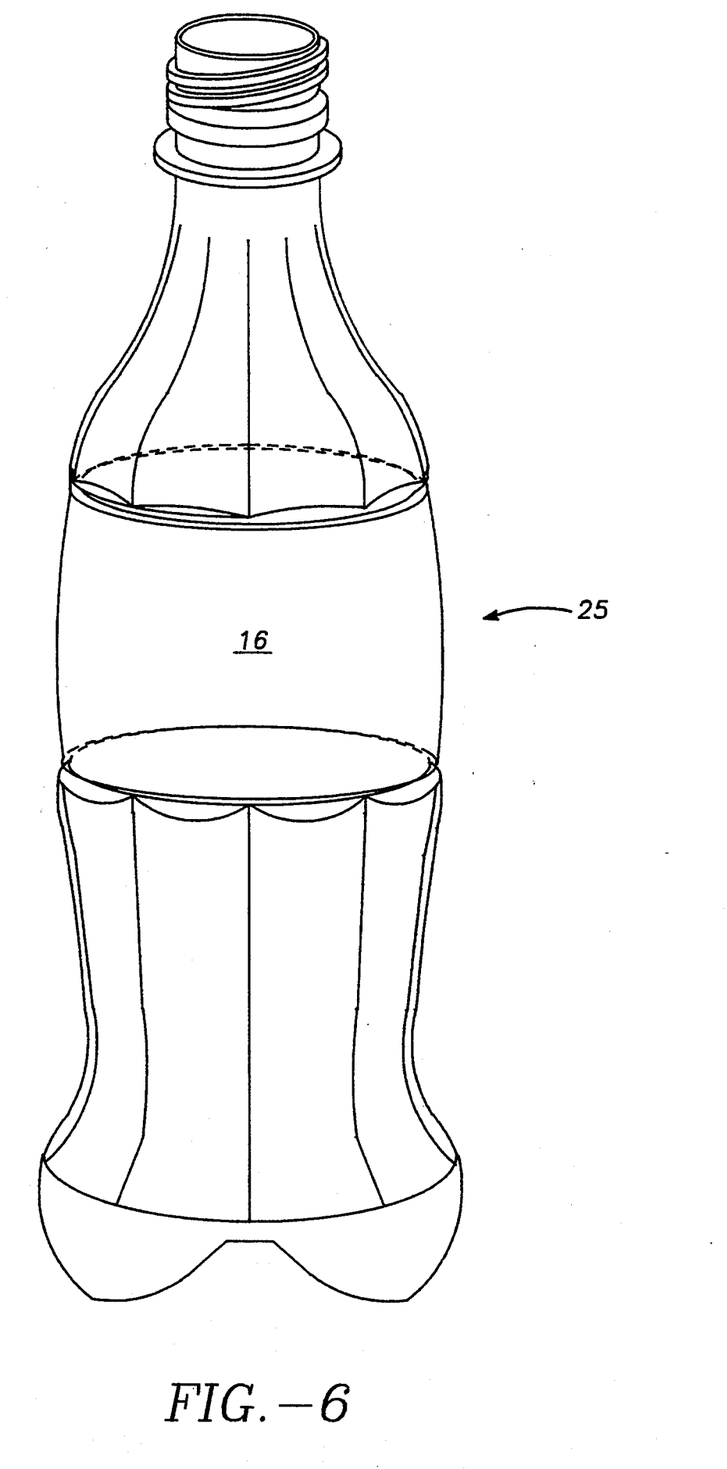
FIG. 6 is a view similar to that in FIG. 2 showing a labeled container.

In FIG. 6 is shown a completely labeled container with the label uniformly applied to and adhered to the convex sector 46.

In the description above, the use of glue or solvent to adhere the label to the container are described and are preferred but heat sealing, for example as in U.S. Pat. No. 5,137,596 may be used, or heat activatable adhesive may be used.

Also, knife-like jets of hot air are preferred but currents of hot air other than knife-like jets may be used, e.g., as in U.S. Pat. No. 4,704,173.

It will thus be apparent that a new and useful method of labeling convex surfaces, a new and useful system and apparatus for carrying out the method and new and useful labeled containers have been provided.

We claim:

1. A method of applying segments of heat shrinkable sheet material to an article, such article having a central, vertical axis, a bottom, a top and a body portion between the bottom and top, at least a portion of said body portion having an outer surface centered on said central axis and presenting a convex surface which is also centered on said central axis, said convex surface presenting a sector of maximum diameter, said method comprising:
   (a) providing a segment of heat shrinkable sheet material having a leading end, a trailing end, upper and lower edges joining the leading and trailing ends, and a body portion bounded by said ends and edges,
   (b) adhesively attaching the leading end of the segment to said sector,
   (c) then wrapping the segment around said convex surface and adhesively attaching the trailing end to said sector or to the leading end of said segment overlying said sector,
   (d) so conducting steps (b) and (c) that the segment is attached to the convex surface along a narrow area adjacent said sector of maximum diameter and major portions of the segment on either side of said narrow area are unattached and then
   (e) heat shrinking said major portions onto said convex surface.

2. The method of claim 1 wherein the article is caused to spin to wrap the label about it in step (c).

3. The method of claim 1 wherein the article is caused to spin during step (c).

4. The method of claim 1 wherein the article is caused to spin in both steps (c) and (e).

5. The method of any of claims 1 to 4 in which the article is a container having a flexible convex surface and in step (b) the sector of maximum diameter is slightly flattened during segment application.

6. The method of any of claims 1 to 4 in which in step (e) a plurality of jets of hot air are applied to the segment above the sector of maximum diameter, such jets being applied at different levels in relation to the area of maximum diameter and a plurality of jets of hot air are applied to the segment below the sector of maximum diameter, such jets being applied at different levels in relation to the sector of maximum diameter.

7. The method of claim 6 wherein the article is caused to move past the jets of hot air while spinning about its central axis and the jets are arranged so that areas of the segments closest to the sector of maximum diameter are exposed first to jets and areas further removed from the sector of maximum diameter are exposed later to jets.

8. The method of any of claims 1 to 4 in which in step (d) heat shrinking is accomplished by applying currents of hot air to said major portions.

9. In the application of a segment of heat shrinkable material to a convex surface of an article, and wherein the segment is applied by adhesive to secure it in substantially tangent relation to that portion of the convex surface of maximum diameter and is then heat shrunk onto such surface, the improvement which comprises effecting such heat shrinking by jets of hot air directed against the so attached segment above and below the area of maximum diameter.

10. The improvement of claim 9 wherein the article is caused to move past a series of knife-like jets of hot air, some of which are above and others of which are below the area of maximum diameter, and the article is caused to spin during such movement.

11. A heat shrink apparatus for continuously heat shrinking segments of heat shrinkable material onto articles, each article having a top, a bottom and a body portion between the top and bottom and having a vertical axis extending between the top and bottom, said body portion including a convex sector centered on said axis and presenting an area of maximum diameter, said apparatus comprising:
   (a) a heat shrinking station,
   (b) means for continuously moving such articles through such station, each article having attached thereto a segment of heat shrinkable sheet material having a leading end, a trailing end, upper and lower edges joining the ends and a body portion bounded by the ends and edges, each segment being wrapped around an article and adhesively attached to said area of maximum diameter,
   (c) means for spinning each such article during movement through the heating station and
   (d) means for applying currents of hot air to each segment as it passes through said station, such application being above and below the area of maximum diameter and being effective to push the segment against the article and to shrink it onto the convex area.

12. The apparatus of claim 11 in which said means (d) is in the form of a series of air nozzles which apply knife-like jets of hot air and are arranged along the path of travel of the articles, one or more of the nozzles being located above and one or more others below the area of maximum diameter.

13. The apparatus of either claim 11 or claim 12 including a label applicator for applying neat shrinkable segments to the convex sectors of the articles including means for flattening the area of maximum diameter of each article during label application, means for spinning each article about its vertical axis during such label application and means for adhesively attaching the leading and trailing ends of the label to the flattened portion of said area.

14. A method of applying a segment of heat shrinkable sheet material to an article, said article having a convex surface presenting a sector of maximum circumference or diameter, said segment having a leading end and a trailing end unattached to the leading end, said method comprising:
   (a) adhesively attaching the leading end of the segment to said convex surface,
   (b) then wrapping the segment around the article,
   (c) adhesively attaching the trailing end of the segment to the convex surface or lapping it over and attaching it adhesively to the trailing end of the segment,
   (d) conducting steps (a), (b) and (c) in such manner that only a narrow sector of the segment is attached to said sector of maximum circumference or diameter and major portions of the segment on either side of said narrow sector are unattached to the article, and
   (e) then applying heat to the segment to shrink said major portions onto the article.

15. The method of claim 14 wherein said sector of maximum circumference or diameter is circular.

16. The method of claim 14 or claim 15 in which the article is a container and in step (b) it is caused to spin to wrap the segment about it.

* * * * *

UNITED STATES PATENT AND TRADEMARK OFFICE
CERTIFICATE OF CORRECTION

PATENT NO.  : 5,403,416

DATED       : April 4, 1995

INVENTOR(S) : Lyn E. Bright and Hugh E. Cummins

It is certified that error appears in the above-identified patent and that said Letters Patent is hereby corrected as shown below:

The title page showing the illustrative figure should be deleted to be substituted with the attached title page.

In the drawings, sheet 4 of 6, consisting of Figure 4 should be deleted to be substituted with the corrected Figure 4, as shown on the attached page.

Column 4, line 29, delete "elevation" and substitute "section".
Column 4, line 52, change "One" to "Two" and change "is" to "are".
Column 6, (Claim 2) line 31, change "label" to --segment".

Signed and Sealed this

Twentieth Day of August, 1996

Attest:

BRUCE LEHMAN

*Attesting Officer*            *Commissioner of Patents and Trademarks*

United States Patent [19]

Bright et al.

[11] Patent Number: 5,403,416
[45] Date of Patent: Apr. 4, 1995

[54] METHOD OF LABELING CONTAINERS WITH CONVEX SURFACES

[75] Inventors: Lyn E. Bright, Ceres; Hugh E. Cummins, Turlock, both of Calif.

[73] Assignee: B & H Manufacturing Co., Inc., Ceres, Calif.

[21] Appl. No.: 992,627

[22] Filed: Dec. 18, 1992

[51] Int. Cl.⁶ ............................................. B32B 31/26
[52] U.S. Cl. ................................... 156/86; 156/446; 156/449; 215/1 C; 215/12.2
[58] Field of Search ................ 156/85, 86, DIG. 9, 156/DIG. 10, DIG. 11, DIG. 12, DIG. 13, DIG. 18, DIG. 25, DIG. 26, DIG. 36, DIG. 37, 446, 449; 215/1 C, 12.2

[56] References Cited

U.S. PATENT DOCUMENTS

| | | | |
|---|---|---|---|
| 3,829,348 | 8/1974 | Spiegel et al. | 156/86 |
| 4,108,709 | 8/1978 | Hoffmann | 156/446 |
| 4,225,049 | 9/1980 | Inoue | 215/12.2 |
| 4,406,721 | 9/1983 | Hoffmann | 156/86 |
| 4,416,714 | 11/1983 | Hoffmann | 156/86 |
| 4,500,386 | 2/1985 | Hoffmann | 156/449 |
| 4,704,173 | 11/1987 | Hoffmann | 156/86 |
| 4,872,931 | 10/1989 | Mitchell | 156/86 |
| 4,976,798 | 12/1990 | Hoffman | 156/86 |

Primary Examiner—Caleb Weston
Attorney, Agent, or Firm—Flehr, Hohbach, Test, Albritton & Herbert

[57] ABSTRACT

Method and apparatus for applying heat shrinkable segments of sheet material to articles having a convex sector, e.g., for applying labels to containers. Each segment is attached at its leading end to the area of maximum diameter of the convex sector, preferably flattening such area and adhesively attaching the leading end of the segment to the flattened area, then spinning the article and wrapping the segment about it and attaching the trailing end to the container or to the leading end, then causing the so wrapped article to pass through a heating and shrinking station, spinning it while so doing and applying jets of hot air to the segment above and below the area of maximum diameter to shrink the segment onto the convex sector. Apparatus suitable for carrying out this procedure is also described.

16 Claims, 6 Drawing Sheets

FIG.-4